United States Patent
Lange et al.

(10) Patent No.: US 6,668,627 B2
(45) Date of Patent: Dec. 30, 2003

(54) SENSOR APPARATUS WITH MAGNETICALLY DEFLECTED CANTILEVER

(75) Inventors: Dirk Lange, Zurich (CH); Christoph Hagleitner, Wallisellen/Zurich (CH); Oliver Brand, Wetzikon/Zurich (CH)

(73) Assignee: Swiss Federal Institute of Technology Zurich (CH)

( * ) Notice: Subject to any disclaimer, the term of this patent is extended or adjusted under 35 U.S.C. 154(b) by 0 days.

(21) Appl. No.: 09/968,946

(22) Filed: Oct. 1, 2001

(65) Prior Publication Data

US 2002/0092359 A1 Jul. 18, 2002

(30) Foreign Application Priority Data

Oct. 4, 2000 (EP) .............................................. 00810914

(51) Int. Cl.$^7$ ................................................. G01B 5/28
(52) U.S. Cl. ........................................................ 73/105
(58) Field of Search ........................... 73/862.639, 104, 73/105

(56) References Cited

U.S. PATENT DOCUMENTS

| | | | | |
|---|---|---|---|---|
| 5,436,448 A | * | 7/1995 | Hosaka et al. | 250/306 |
| 5,468,959 A | * | 11/1995 | Tohda et al. | 250/306 |
| 5,900,728 A | * | 5/1999 | Moser et al. | 250/306 |
| 5,936,237 A | * | 8/1999 | van der Weide | 250/234 |
| 5,983,712 A | * | 11/1999 | Lindsay et al. | 73/105 |
| 6,396,261 B1 | * | 5/2002 | Martchevskii et al. | 324/233 |

* cited by examiner

Primary Examiner—Max Noori
(74) Attorney, Agent, or Firm—Bachman & LaPointe, P.C.

(57) ABSTRACT

A magnetically excited, resonant cantilever sensor apparatus has a cantilever as the transducer element. A static magnetic field is directed in the plane of the cantilever(s) cooperating with a current loop in/on the latter. Orienting the magnetic field along or perpendicular to the cantilever axis and controlling the current apprpriately allows for selective excitation of resonance or non-resonance modes and/or in a self-oscillation mode. The deflection of the cantilever is detected using piezoresistive or magnetic readout. The apparatus may be used as gas sensor, scanning force microscope, mechanical filter, temperature sensor or the like.

16 Claims, 5 Drawing Sheets

SENSOR APPARATUS WITH MAGNETICALLY DEFLECTED CANTILEVER

BACKGROUND OF THE INVENTION

1. Field of the Invention

The present invention relates to sensors, or more generally to apparatuses for exciting and detecting mechanical deflections and to the use of such apparatuses for mass-sensing, scanning probe microscopy, filtering electronic circuits, and similar applications. For such applications, cantilever structures and transducers of this structure are widely used because of their relative simplicity and robustness.

2. Related Art

As mentioned, cantilever transducers have a number of applications as force sensors for scanning probe microscopes and as acceleration sensors; other applications include their use as chemical and biochemical sensors. An examples is shown in Thundat et al U.S. Pat. No. 5,719,324 "Microcantilever Sensor". Typically, cantilever devices employ piezoelectric films as one layer of the cantilever, but capacitive excitation has also been demonstrated, cf. S. Suzuki et al: "Semiconductor capacitance-type accelerometer with PWM electrostatic servo technique" in Sens. Actuators A21–A23, pp. 316–319, 1990. Usually the cantilever is fabricated using micromachining processes on a silicon wafer, cf. S. M. Sze in the book "Semiconductor Sensors" by John Wiley & Sons, Inc., New York.

However, the known devices and structures have some disadvantages which limit their applicability, as will be explained. Thermal actuation of the cantilever, for example, has the disadvantage of requiring a relatively high heating power to excite cantilevers at high frequencies. Furthermore, the application of heat to a chemically sensitive cantilever may clash with the desired functionality of the device. On the other hand, electrostatic actuation—which allows for high excitation frequencies—requires application of an electrostatic field by a counter electrode, which complicates structure and fabrication and thus limits the applicability of such a cantilever. Piezoelectric actuation requires the use of piezoelectric materials on the cantilever which often interfere with other surface materials, as e.g. required for chemical sensors. Also, it would be advantageous to allow the integration of a cantilever with the appropriate electronic sensing and/or excitation circuits. This limits the applicable fabrication processes.

The above problems are often aggravated when a resonant cantilever is used, i.e. a cantilever oscillating with its resonant frequency, where usually the frequency variation affected or influenced by external matters is used as readout. As an example, thermal excitation with a purely sinusoidal heating voltage may result in smaller temperature increases. However, the deflection of the cantilever will be proportional to the heating power and, thus, at twice the frequency. The operation of such a device in oscillation mode requires signal processing of advanced complexity.

For some other applications, magnetic actuation of cantilevers has been proposed. B. Shen et al describe such a structure in "CMOS Micromachined Cantilever-in-Cantilever Devices with Magnetic Actuation", IEEE Electron. Device Letters, Vol. 17, No. 7, July 1996, pp. 372–374. The structure described by Shen, however, is a rather complex microactuator specifically designed to achieve a large angular deflection. It consists so-to-speak of conductor system carrying a conductor-free central cantilever. A current in the conductor system and a surrounding static magnetic field produce Lorentz forces deflecting the central cantilever. The authors concentrate on the fabrication of this structure to deliver high angular deflections which are detected using external optical components. However, from a mechanical and electrical viewpoint, just this complexity limits the applicability of the structure—it increases system cost and poses limits on the miniaturization.

Lee et al. describe a cantilever for application in the so-called tapping mode in scanning probe microscopy in "Cantilever with integrated resonator for application of scanning probe microscope", Sensor and Actuators 83 (2000), 1996, pp. 11–16. The cantilever uses a magnetically driven torsional resonator to monitor the interaction force between the cantilever tip and the sample to be probed. In close vicinity to the sample, the vibration amplitude of the torsional resonator structure is a function of the force (gradient) between sample and tip. The vibration amplitude is measured using a second inductive coil on the resonator. The cantilever is then moved by magnetic actuation so that the vibration amplitude of the resonator remains constant. This way, the cantilever follows the topography of a sample. However, with this method, cantilever deflections are only detected in the close vicinity of a sample and thus its applicability is limited to the case of dynamic scanning probe microscopy.

Starting from the described prior art, it is a primary object of the invention to provide a simple and robust cantilever device requiring neither piezoelectric material nor thermal nor capacitive actuation and using magnetic actuation instead.

Another object of the invention is the provision of a cantilever apparatus highly compatible with microelectronic circuits to enable simple fabrication and possible integration of cantilever and associated microelectronics.

A further object is to provide a robust cantilever device whose excitation mechanism does not interfere with chemically sensitive films on the cantilever.

BRIEF SUMMARY OF THE INVENTION

The present invention circumnavigates the above problems and provides a solution to the above objects issues by creating a novel magnetic excitation approach for the cantilever. The gist of the invention can be said to consist in the integration of part of the magnetic excitation structure into the cantilever.

Thus, the invention can be briefly described as a cantilever structure and device comprising: a conductor on or in a cantilever, a static magnetic field orthogonal to said conductor, and the energization of the conductor with an electric current to achieve the desired function. In a specific embodiment, the conductor is formed as a current loop. Another embodiment shows a straight conductor, but other forms are also possible. Further, excitation may be in the resonant mode or non-resonant mode.

Thus, a cantilever structure and device according to the invention neither requires piezoelectric material nor any thermal actuation. It provides for a robust and simple cantilever structure that is highly compatible with microelectronic circuits, so that its direct integration into microelectronic circuits represents no problem.

A further advantage of the present invention is its non-interference with chemically sensitive films, so that highly sensitive chemical sensors can be implemented.

Yet another advantage of the present invention is its ready adaptability as a resonant mass-sensitive device. This is because the resonance frequency of a cantilever depends on the mass load. Magnetic actuation here offers the important advantage of low power consumption.

A still further advantage is that separate conductors or current loops can easily be provided on the cantilever, one e.g. for excitation, another for readout.

With all these advantages, a cantilever device according to the invention may be used in scanning probe microscopy, but is also easily adaptable as an acceleration sensor, as filtering device in electronic circuits, or for any other purpose where resonant or non-resonant cantilever structures are desired.

BRIEF DESCRIPTION OF THE DRAWINGS

Examples of embodiments illustrating the invention are depicted in the drawings and described in detail below. Here is a brief summary of the appended drawings.

For the sake of clarity, the figures do not necessarily show the correct dimensions, nor are the relations between the dimensions always in a true scale.

DETAILED DESCRIPTION OF EMBODIMENTS OF THE INVENTION

Figure 1:
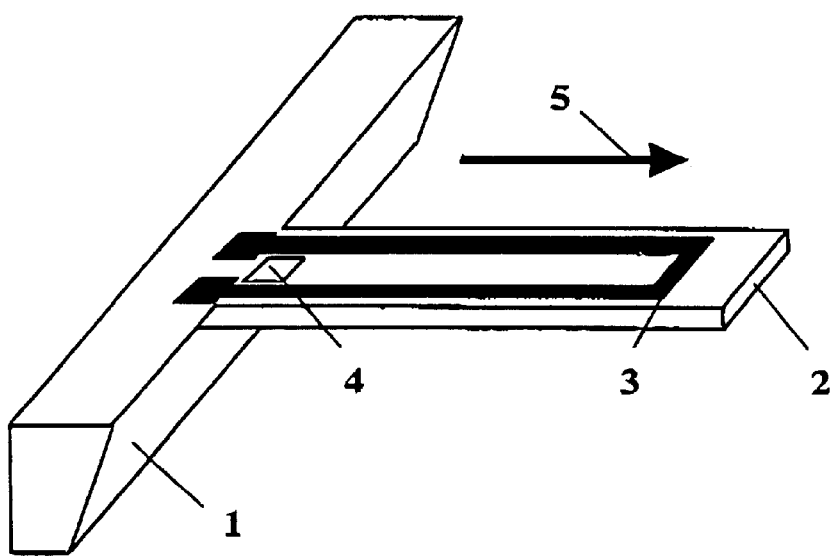
FIG. 1 is a perspective view of a cantilever apparatus according to the invention.

FIG. 1 shows a typical layout of a cantilever according to the invention in perspective. Cantilever 2 is at one end fixed to support base 1 which is part of the assembly, not shown in detail. Both, support base 1 and cantilever 2 are made from semiconductor material, e.g. silicon. Thus, a deflection sensor 4 can be directly integrated on the surface of cantilever 2, here located close to support base 1. Also on cantilever 2 is a conductor forming a current loop 3 in form of a U, usually made from metal or another conductive material. Arrow 5 indicates the direction of a static in-plane magnetic field. The source of this magnetic field is not shown; a conventional permanent magnet, direct-current (DC) coils, or the like may be used.

Figure 2:
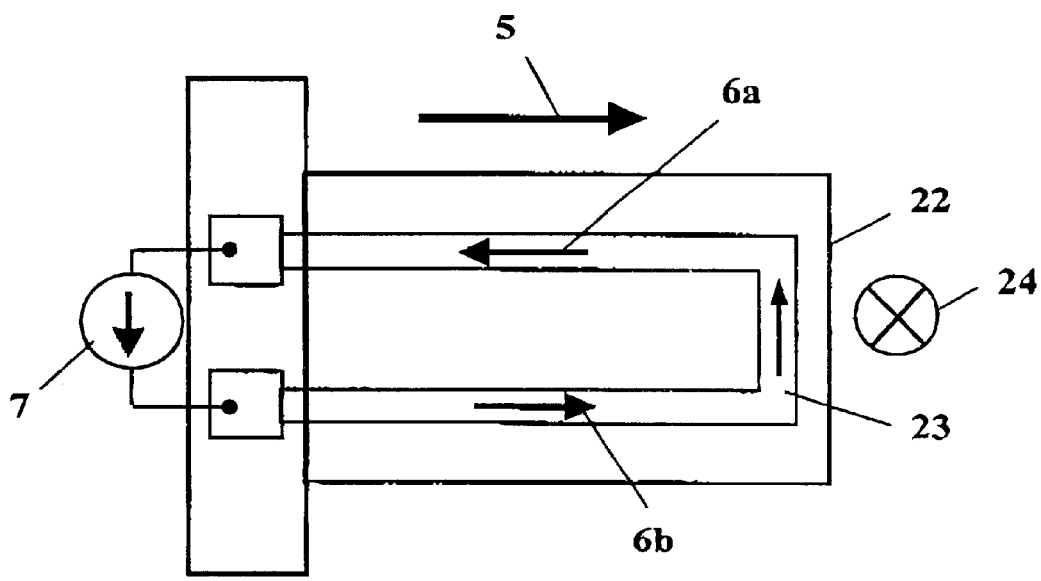
FIG. 2 is a schematic diagram showing the situation of the current with an applied magnetic field with the resulting Lorentz force.
Figure 3:
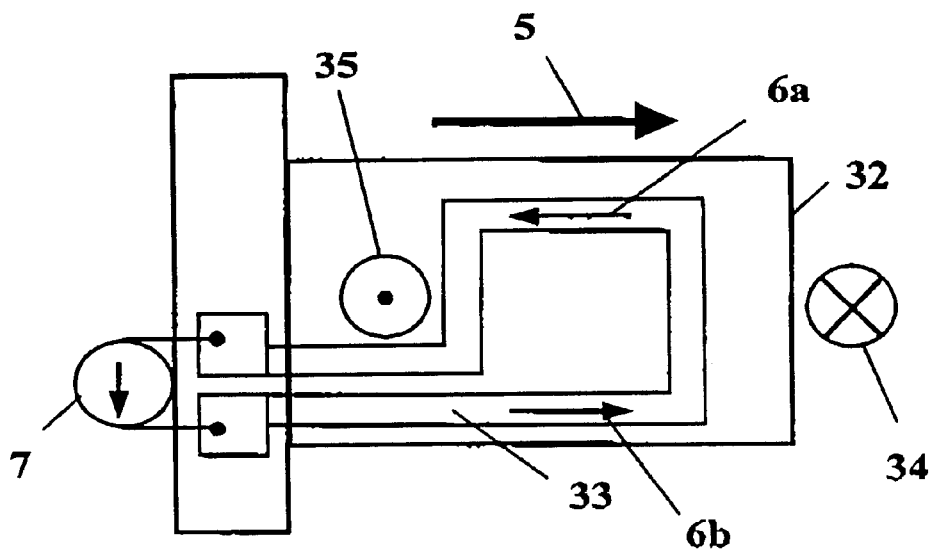
FIG. 3 is a schematic diagram of a cantilever with an alternatively shaped conductor, also showing the interaction of the current with an applied magnetic field with the resulting Lorentz force.

FIGS. 2 and 3 show two variations of a cantilever 22 and 32 with different conductor loop shapes. In operation a current, driven by current source 7 and indicated by arrows 6a and 6b in both figures, is applied to current loops 23 and 33, resp., resulting in surface-normal Lorentz forces 24 and 34,35 resp., directed according to the right hand rule (motor action). This Lorentz force in turn induces a motion, i.e. a deflection, of the cantilevers 22 and 32, resp. The force per unit length of the conductor is given by $$\vec{F} = \vec{I} \times \vec{B}.$$

If alternating current is applied to any of the current loops 23 or 33, the deformation or deflection of cantilever 22 or 32, resp., is reversed every half-cycle, resulting in an oscillation of the cantilever. Thus an integrated resonant cantilever may be created. In addition, the shape of the conductor loop in FIG. 3 allows for efficient excitation of higher order modes, thus creating a wide variety of applications.

Generating oscillations of the cantilever has two results:

1. The motion of current loop 3 in the magnetic field generates a back-EMF (Electro Magnetic Force), whose voltage opposes the voltage originally applied to the current loop. This back-EMF changes the electrical impedance of current loop 3. At frequencies in the neighborhood of the cantilever resonance, the impedance comprises an ohmic resistance Ro and a motion resistance $R_m$. This is the basis for single-port detection of the cantilever deflections.

2. The motion of the cantilever generates an output voltage (right hand rule, generator action) in a second conductor on or in the cantilever. This is the basis for two-port operation.

Figure 4:
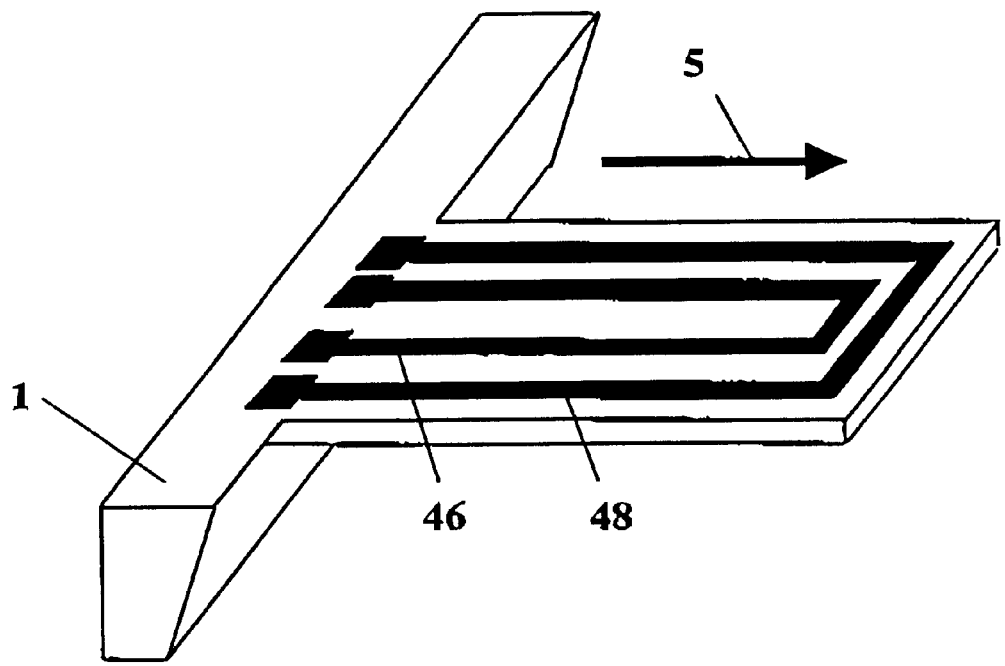
FIG. 4 is a perspective view of a cantilever apparatus with a second conductor for detecting deflections of the cantilever.

FIG. 4 is a perspective view of a cantilever apparatus having a first current loop 46 and a parallel, second current loop 48. The two separate conductors allow for a two-port, independent measurement. Alternatively, one current loop may be used for excitation, the other for absolutely independent deflection detection. Though the two current loops are shown on the same side of the cantilever, they may as well be situated on opposite sides of the latter.

Figure 5:
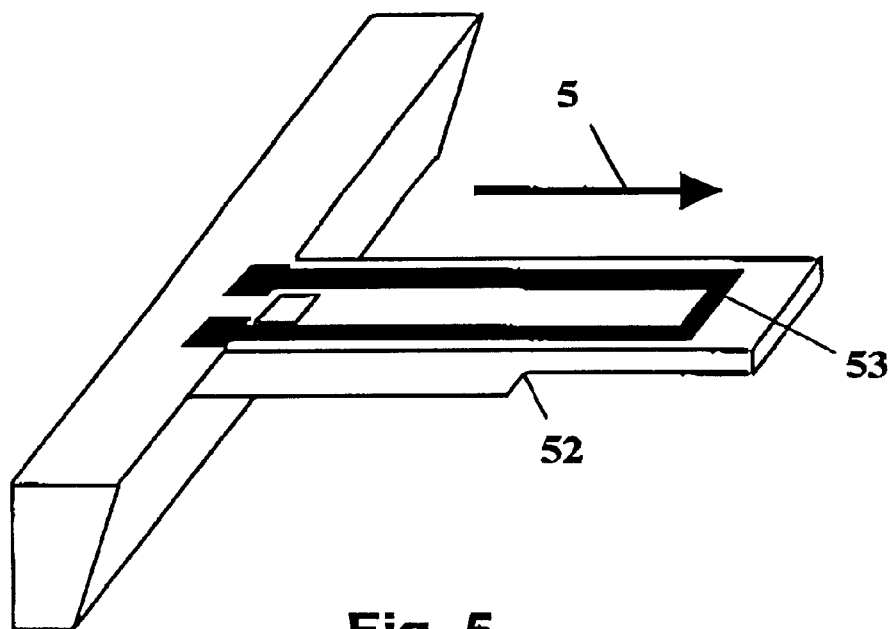
FIG. 5 is a perspective view of a cantilever apparatus with a modified cross-section.

FIG. 5 is a perspective view of a cantilever apparatus with a modified cross-section of the cantilever 52. This modification obviously changes the deflection and oscillation characteristics and thus may be used, if appropriately adjusted, for special sensing purposes, e.g. for improved mass sensing. Current loop 53 is essentially unchanged as compared to the previous embodiments.

Cantilever 52 is modified at its tip by a so-called "sensing section" of reduced mass per cantilever area, e.g. by a reduced thickness, indicated by 54. A mass increase on this sensing section 54 results in a higher relative mass change of the resonator, which significantly increases the relative mass-sensitivity of the apparatus. Since the section of the cantilever 52 close to the suspension remains thicker, a reduced stiffness of sensing section 54 does not decrease the base frequency of the resonator. This way the improved mass-sensitivity of the device translates into a higher shift of the cantilever's resonance frequency.

Figure 6:
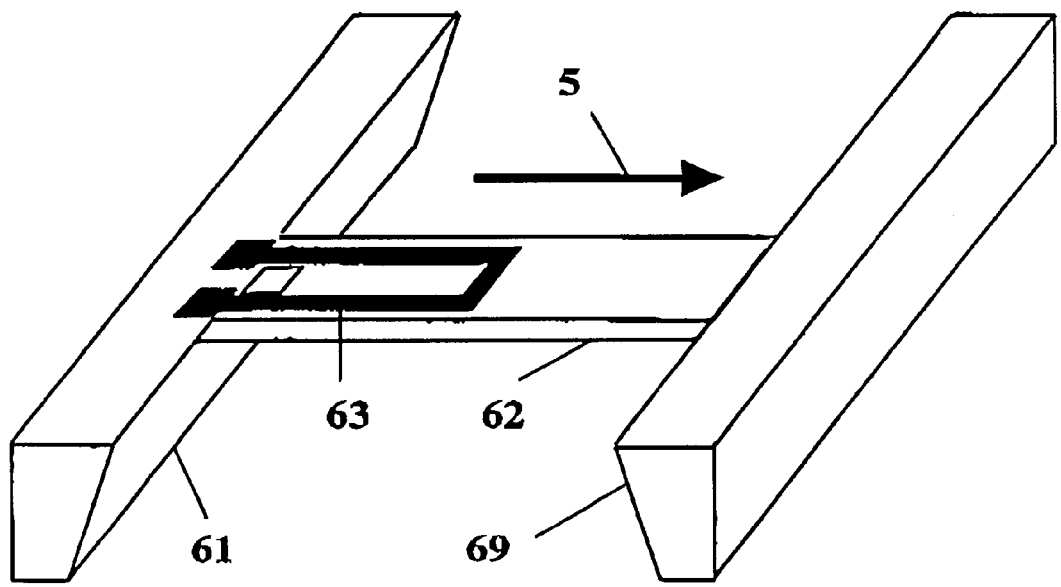
FIG. 6 is a perspective view of a cantilever apparatus clamped at both sides with a magnetic field parallel to the cantilever and an alternatively shaped conductor.

FIG. 6 is a perspective view of a cantilever 62 which is clamped at both ends by support bases 61 and 69, resp. This again modifies the deflection and oscillation characteristics significantly and thus can be adapted to special sensing purposes. Current loop 63 is still essentially unchanged, but may not extend over the full length of cantilever 62 because of the altered characteristics of the latter. Compared to an extending cantilever, i.e. a cantilever fixed only on one side, the bridge structure shown has a higher mechanical stiffness, and hence exhibits a higher sensitivity as a mass sensor.

Figure 7:
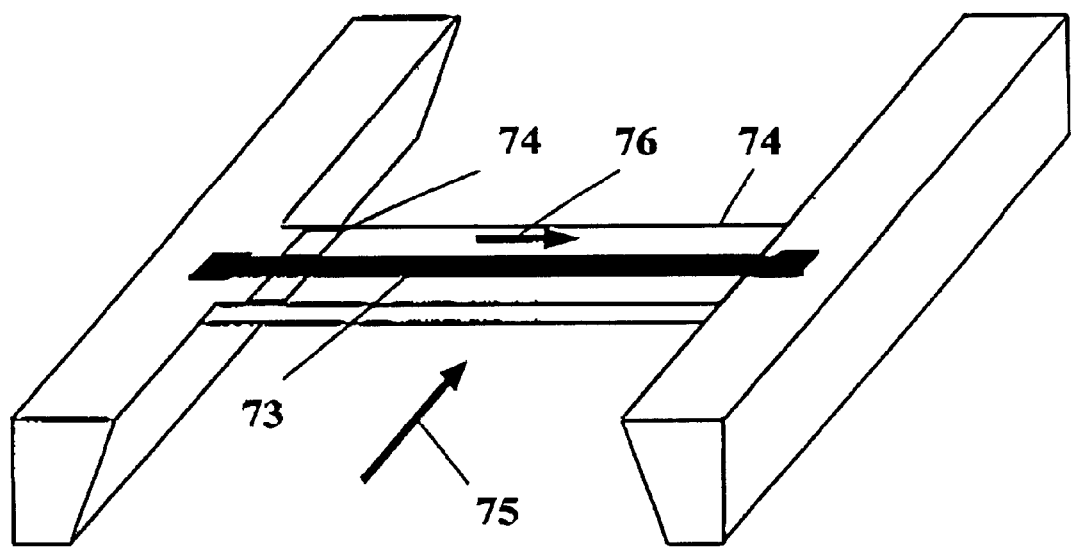
FIG. 7 is a perspective view of an also double-clamped cantilever and an alternatively shaped conductor with a magnetic field perpendicular to the cantilever.

FIG. 7 shows again a cantilever 72 clamped at both ends by support bases. This time, the magnetic field is situated perpendicular to the cantilever 73, as indicated by arrow 75. This change and alternatively shaped conductor 73 carrying current 76 in operation provides the further advantage of simplifying the electrical connections to the deflection sensor 64 and conductor loop 63 on cantilever 72. This in turn reduces the dimensions of the device and may enable achieving higher resonance frequencies of the resonator. A different use may be the use as a resonant temperature sensor, in which a change in the ambient temperature leads to a change of the resonator's resonance frequency via mechanical stress due to thermal expansion of the bridge.

Figure 8:
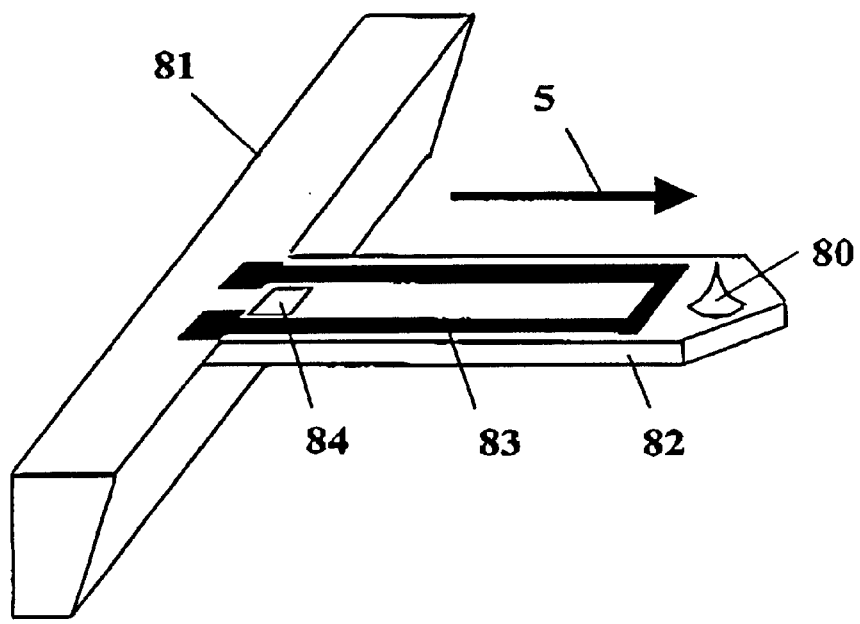
FIG. 8 is a perspective view of a cantilever apparatus for use in scanning force microscopy applications.

FIG. 8 is a perspective view of a cantilever apparatus to be preferably employed in scanning force microscopy applications. Cantilever 82 carries at its appropriately shaped free end a tip 80, which may be used to scan a surface in a scanning probe microscope (SPM). Such a cantilever would be particularly suited for use in an oscillating SPM, e.g. in the so-called tapping mode. It also offers the operation in air and liquid media. Tip 80 may be as well placed at the bottom of cantilever 82. The obvious advantage of such a design is that all elements forming the cantilever and necessary for its operation, i.e. tip 80, base 81, cantilever 82, current loop 83, and deflection sensor 84, can be made from a single material, i.e. silicon, by known semiconductor and micromechanical technologies and thus be fully integrated. Of course, a tip for SPM or similar uses may also be applied to any other of the structures and devices shown, this adaptation should not present a problem to a person skilled in the art.

Figure 9:
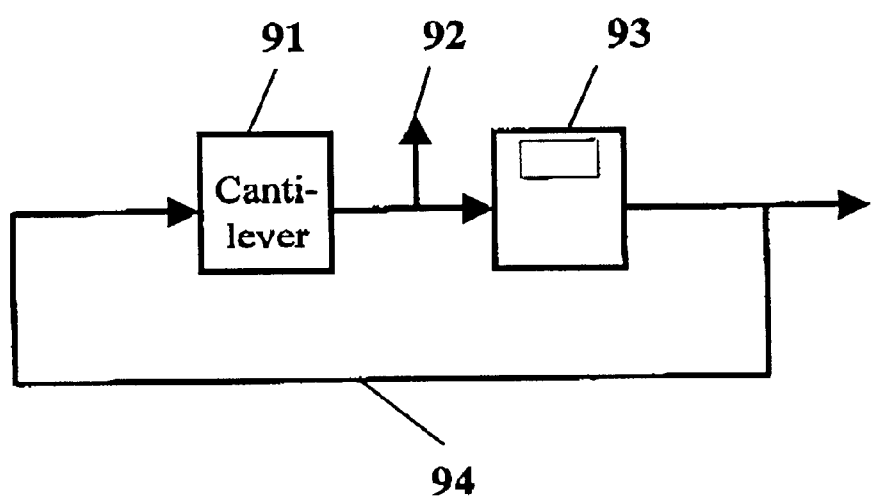
FIG. 9 is a schematic diagram of a cantilever apparatus connected to electronic elements to perform a self-oscillation of the cantilever at its resonance frequency.

FIG. 9, finally, shows a block diagram in which the magnetically actuated cantilever apparatus described above is an element of a self-oscillation circuit. In this self-oscillation circuit, the detected deflection signal 92 of the cantilever apparatus is applied to an electronic circuit 93. This electronic circuit potentially modifies the signal and applies it back to the cantilever apparatus as an excitation signal 94 which leads to a self-excitation of the cantilever at the resonance frequency. The resonant frequency or the vibration amplitude at the resonance frequency can be determined e.g. from the signals 92 or 94 and utilized for further purposes, e.g. for determining mass changes on the cantilever.

While the present invention has been described by way of a few examples, these shall not limit the scope of protection since it is obvious to someone skilled in the art that the invention can be easily adapted to match many requirements in the field of cantilever design and/or manufacturing and integration, be it for any type of scanning probe microscopes or sensing applications where such designs are being used.

What is claimed is:

1. A sensor apparatus, comprising a cantilever, an associated magnetic energizing system for deflecting said cantilever, and a deflection detector, comprising in combination
    a static magnetic field external to said cantilever, a magnetic vector of said field extending in plane with said cantilever's longitudinal extension,
    a conductor loop on or in said cantilever for an electric current,
    means for energizing said conductor loop with an electrical current for exciting mechanical deflections of said cantilever, and
    means for detecting a deflection of said cantilever integrated onto or into said cantilever.

2. The apparatus according to claim 1,
    wherein the means for energizing the conductor with an electrical current excites the cantilever in a resonant or a non-resonant mode and/or in a self-oscillation mode.

3. The apparatus according to claim 1,
    wherein the means for energizing the conductor with an electrical current excites the cantilever employing a detected deflection of the cantilever or a change in its resonance frequency as the output signal of the apparatus.

4. The apparatus according to claim 1,
    wherein the means for energizing the conductor with an electrical current excites the cantilever and a change in resonance frequency of the cantilever is detected.

5. The apparatus according to claim 1,
    wherein the magnetic field extends parallel or at an angle, specifically perpendicular, to the extension of the cantilever.

6. The apparatus according to claim 1, wherein the means for detecting the cantilever deflection includes or is an integrated stress-sensitive sensor, preferably a piezoresistive sensor, and includes or is connected to a Wheatstone bridge.

7. The apparatus according to claim 1, wherein the means for detecting the cantilever deflection comprises an impedometric measurement unit for the energized current conductor.

8. The apparatus according to claim 1, wherein a first and a second conductor are provided on or in the cantilever, one of said conductors serving to detect the cantilever deflection.

9. The apparatus according to claim 1, wherein the means for detecting the cantilever deflection is an optical detector, preferably comprising an interferometer, said optical detector including a light source and a position-sensitive photodetector for receiving a light beam reflected by the cantilever.

10. The apparatus according claim 1, wherein the means for detecting the cantilever deflection is a capacitive sensor comprising a capacitive plate adjacent to the cantilever.

11. The apparatus according to claim 1, wherein the cantilever includes a chemically sensitive layer on at least one of its surfaces.

12. The apparatus according to claim 1, wherein the means for detecting the cantilever deflection includes or is an integrated stress-sensitive sensor, preferably a piezoresistive sensor, or includes or is connected to a Wheatstone bridge.

13. A cantilever for a sensor apparatus, for mass-sensitive detection,
    said cantilever having a fixed end and a free end and being of variable stiffness along its longitudinal extension,
    having a stiffer section close to the fixed end and a not so stiff section close to said free end, said fixed end being equipped for attachment to said sensor apparatus, said free end serving as a sensing section when its mass is changed,
    said cantilever in a sensor apparatus comprising said cantilever, an associated magnetic energizing system for deflecting said cantilever, and a deflection detector, comprising in combination
        a static magnetic field external to said cantilever a magnetic vector of said magnetic field extending in plane with said cantilever's longitudinal extension,
        a conducting loop on or in said cantilever for an electric current,
        means for energizing said conductor with an electrical current, thereby exciting mechanical deflections of said cantilever, and
        means for detecting a deflection of said cantilever integrated onto or into said cantilever.

14. The cantilever according to claim 13, comprising a chemically sensitive film formed upon at least one of its surfaces.

15. A scanning probe microscope, comprising at least one of:
(1) a sensor apparatus comprising a cantilever, an associated magnetic energizing system for deflecting said cantilever, and a deflection detector, comprising in combination
a static magnetic field external to said cantilever a magnetic vector of said magnetic field extending in plane with said cantilever's longitudinal extension,
a conducting loop on or in said cantilever for an electric current,
means for energizing said conductor with an electrical current, thereby exciting mechanical deflections of said cantilever, and
means for detecting a deflection of said cantilever integrated onto or into said cantilever, and
(2) a cantilever according to claim 13, and a tip coupled or fixed to the cantilever.

16. The scanning probe microscope according to claim 15, wherein the cantilever is excited in a self-oscillation mode by the means for energizing the conductor with an electrical current.

* * * * *